United States Patent Office 3,420,128
Patented Jan. 7, 1969

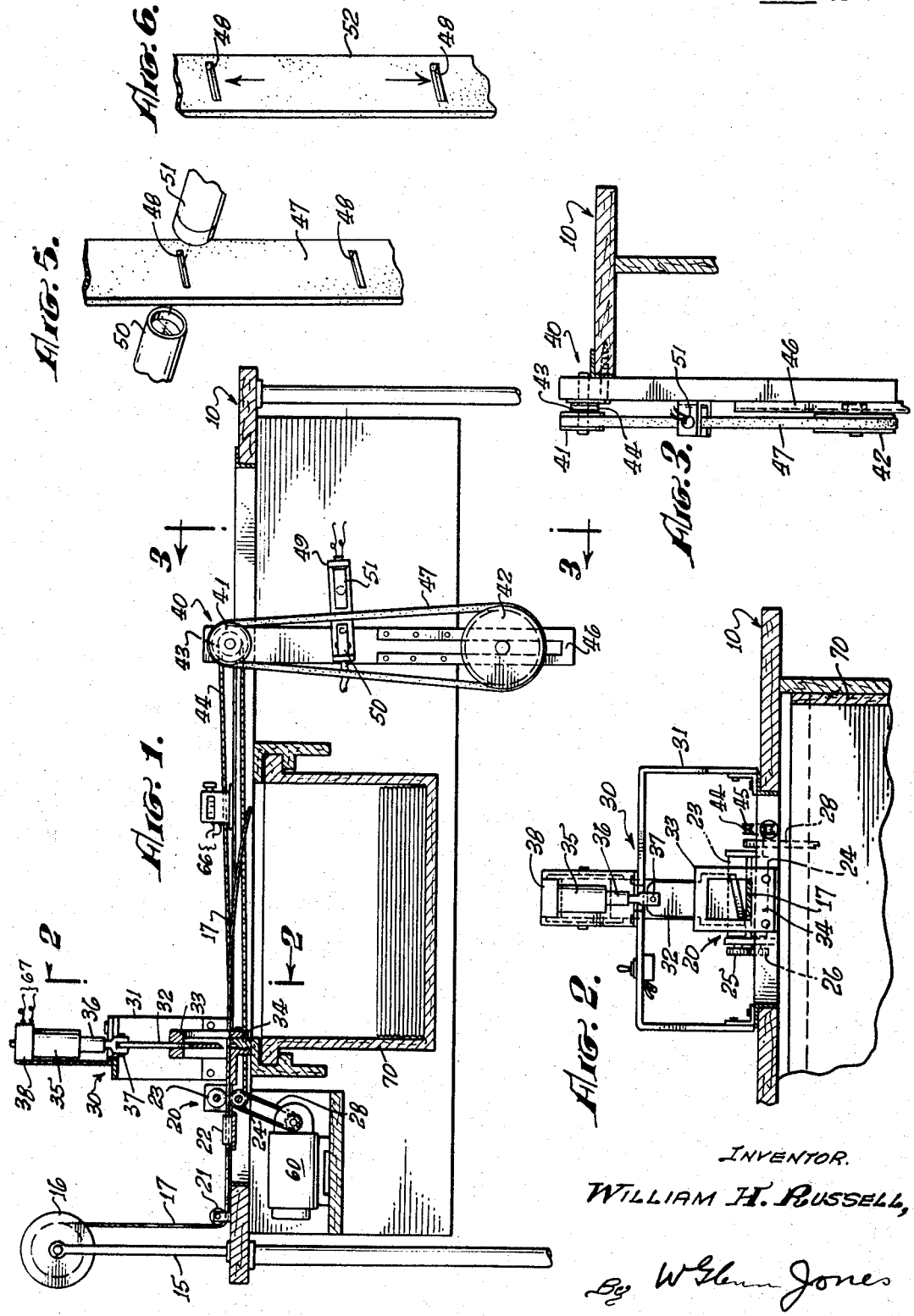

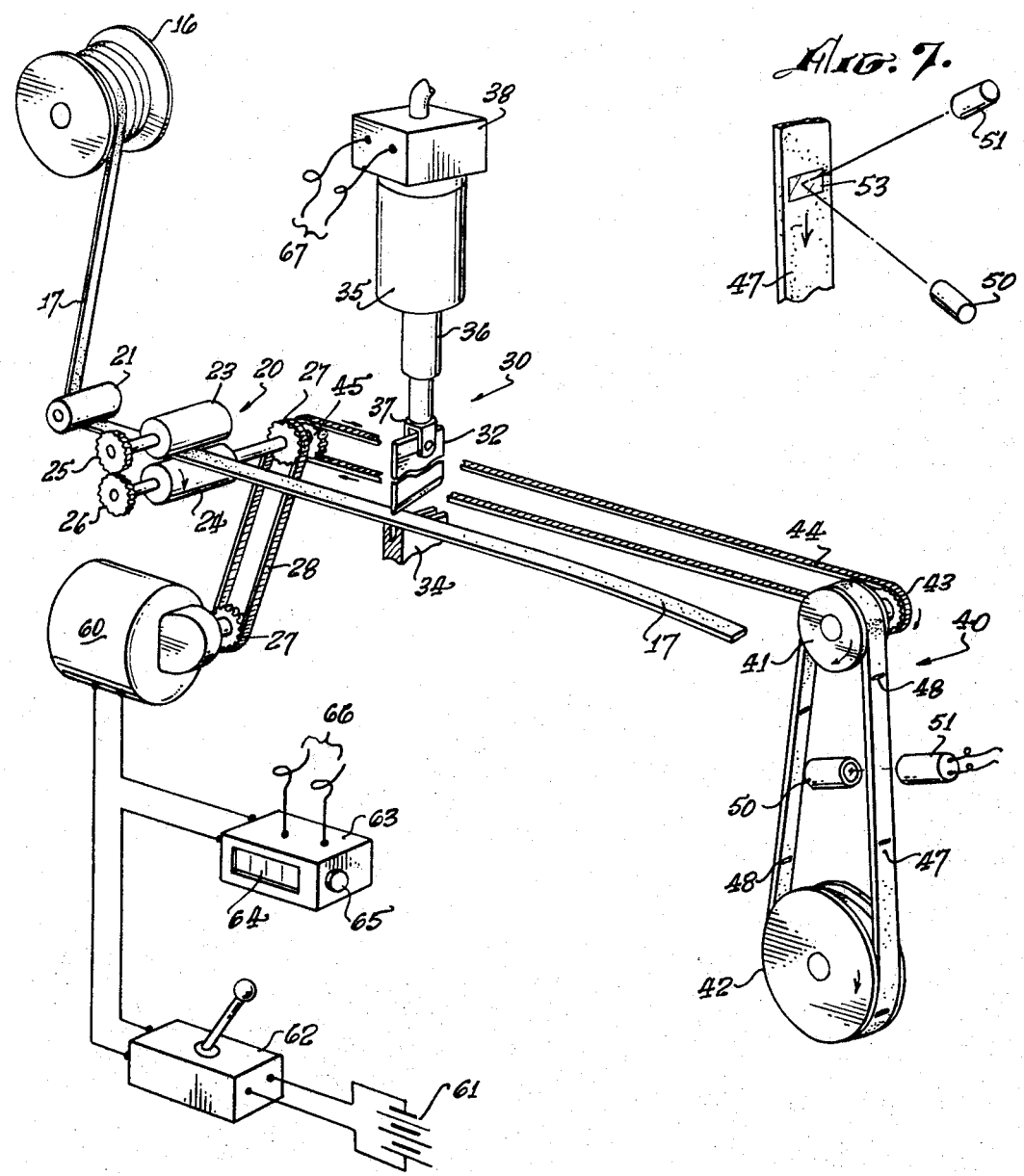

3,420,128
STRIP CUTTING MACHINE
William H. Russell, 21515 Strathern St.,
Canoga Park, Calif. 91304
Filed July 13, 1965, Ser. No. 471,633
U.S. Cl. 337—35                                        2 Claims
Int. Cl. B26d 5/30

This invention relates generally to strip cutting machines and particularly to a strip cutting machine controlled to cut strips of any desired predetermined length in any predetermined quantity.

In the manufacture of shoe and sandal-type footwear, it is necessary to cut many strips or ribbons of predetermined length for inclusion in such footwear. The material from which these strips or ribbons are formed may be of fabric, leather, plastic, metal foil, wire or other suitable cuttable materials. While generally the widths of such materials are comparatively narrow, it is obvious that the machine may be adapted to receive any width material.

Heretofore, the preparation of such strip material has necessitated hand cutting by scissors or manual clippers which process is slow, tedious, and results in inaccurate lengths. Any appreciable variation in length results in rejection and waste. By the use of my strip cutting machine, such strips may be rapidly cut to predetermined accurate lengths, in any predetermined quantity. Since the device, when properly set to accomplish its purpose, can operate without human supervision, it is manifest that the saving of labor costs may be quite substantial. The elimination of rejects for inaccurate lengths also means a considerable economy of operation.

With the above in view, the object of my invention, therefore, is to provide a strip cutting machine which will deliver strips of any cuttable material cut to predetermined accurate lengths and in a predetermined quantity.

Another object of my invention is to provide a strip cutting device which, when set, will operate without human supervision.

A further object of my invention is to provide a strip cutting machine which will not only effect great economies in operation but is dependent only on easily available sources of energy, compressed air and commercially supplied electric current.

Still another object of my invention is to provide a strip cutting machine which requires a minimum of set-up time and number of set-up operations to enable it to perform its functions.

Further objects and advantages of my invention will appear in the following detailed description in connection with the accompanying drawings wherein like characters refer to like parts throughout the various views and wherein:

FIGURE 1 is a longitudinal cross-sectional view of the machine as now set up;

FIG. 2 is a transverse cross-section taken on the line 2—2 of FIG. 1 showing details of the knife or strip cutting portion of the machine;

FIG. 3 is a partial transverse cross-section taken on the line 3—3 of FIG. 1 showing details of the control unit;

FIG. 4 is a schematic view illustrating the operating details of my invention;

FIGS. 5 and 6 are enlarged views of portions of the control unit; and

FIG. 7 is a schematic view of a modification of the control unit.

As shown in FIGS. 1 and 4, the principal elements of my strip cutting machine are a table or supporting structure 10, a reel support 15 for holding a reel of the cuttable material, a motor-operated feeding device 20 for feeding the material under or through the cutting device 30, a photo-electric control device 40, and a mechanical power source 60.

The reel support 15 may be of any convenient configuration to rotatably support a reel 16 of cuttable strip material 17. The strip 17 descends vertically and passes under idler roller 21 which is supported rotatably on the upper surface of table 10. The strip 17 then passes through adjustable guides 22 on the way through the compression and drive rollers 23 and 24. The guides 22 are adjustable in width to accommodate the various width materials used. Roller 23 is adjustable vertically to accommodate the various thicknesses of strip material used and to provide sufficient compression against the drive roller 24 so as to positively control the passage of the strip material therethrough and under the cutting or severing portion of the cutting device 30. It will be further noted in FIG. 4, these rollers are geared together by similar diameter spur gears 25 and 26. Turning in unison at the same speed in opposite directions, this geared arrangement further insures positive control of movement of the strip material through the cutting device. As may be further noted in FIG. 4, drive roller 24 is positively connected to the geared motor power source 60 by means of sprockets 27 and roller sprocket chain 28. While belts and pulleys could be utilized to connect the various rotating parts, it has been found that the positive control of strip movement is best effected by some mode of positive connection as afforded by the sprocket and roller chain arrangement.

The cutting device 30 may be best described as a power actuated guillotine. As shown best in FIG. 2, it comprises a general support structure 31 which may be secured to the upper surface of table 10. The guillotine knife 32 moves vertically in knife guide 33 which includes a grooved platen 34. This platen receives the downwardly thrusting knife blade and thus provides the cutting action for severing the strip material passing over the platen and under the knife. The knife guide 33 is suitably secured to the table top 10 under the support structure 31.

Supported on the upper surface of the structure 31 and generally in line with the knife 32, is the actuating power cylinder 35, as shown, the vertical ram 36 of this power cylinder is connected to the top of the knife 32 by a form of universal joint 37 which allows for slight misalignment of the axes of ram and knife. This power cylinder is supplied with controlled compressed air as its actuating force. This air cylinder is a commercially-available article embodying a solenoid-operated air valve 38 which releases compressed air to the cylinder under the influence of the control device 40. The air cylinder contains a poppet valve which reverses the flow of air at the bottom of the stroke, thus retaining the ram rapidly to the initial position. The air is then cut off and the cylinder is ready for the next cycle. This action, as noted, is very rapid and up to 1000 strokes a minute may be effected.

As shown in FIGS. 1, 3 and 4, the photo-electric control device 40 comprises a fixed top-flanged pulley 41 and an adjustable lower-flanged pulley 42. Upper pulley 41 is rotatably secured to the upper surface of table 10 and its axis carries a sprocket 43 which is connected by a roller chain 44 to a sprocket 45 installed on the axle of the drive roller 24 adjacent to sprocket 27. Lower pulley 42 is supported in guides 46 and may be adjusted vertically with relation to the upper pulley 41. While ordinarily it has been found sufficient to make pulley 42 large and heavy enough so as to adjust itself by gravity, resilient means could be carried by the guides 46 so as to force this pulley downwardly with relation to pulley 41. Extending between the two flanged pulleys, is a slotted belt 47 provided with slots 48 which may be punched or otherwise suitably formed in the material of belt 47.

Supported adjacently to the belt 47, is the photo-electric unit 49 which comprises the photocell detector unit 50 and the light source 51 mounted on opposite sides of the belt. As the normally interrupted light beam passes through the slot, the photocell unit is activated and a power relay (not shown) is closed in the usual manner.

In the configuration shown, where the gears and sprockets are in one-to-one relationship, the distance between the slots 48 governs the length of the strip being cut. Thus, if the desired length of strip is, say 9 inches, the distance between slots is also 9 inches. The belt 47, therefore, must be of a length which is a multiple of 9 inches, i.e. 27, 36, etc. Since, normally, different belts will be required for each chosen strip length, the need for the adjustability of pulley 42 with relation to fixed-position pulley 41 becomes apparent. Obviously, by changing the geared relationship between the drive roller 24 and the belt driving pulley 41, the distance between slots 48 and the length of strip being cut can be established at any desired ratio.

Where it is desired to vary the length of the strip being cut within reasonable limits, either shorter or longer, the belt 52 in FIG. 6 may be made of stretchable material, say some type of elastomer. In this event, some positive means of adjustment of the distance between belt pulleys 41 and 42 would be required.

While as normally used the photo-electric light beam passes through the slots 48 in belt 47, it might be desirable to use a reflective system as indicated in FIG. 7. Here belt 47 carries a spot 53 of reflective material. In this modification, the photocell unit 50 and light source 51 are mounted on the same side of the belt.

As indicated in FIG. 4, the mechanical power source 60 may be a geared electric motor connected to the drive roller 24 by means of sprockets 27 and roller chain 28. Its power is derived from a source of EMF 61 which passes through the speed control unit 62 and the counter-switch unit 63. While the EMF 61 is indicated as a battery, it may be A.C.

The speed control unit 62 is a standard item and may be of any suitable type.

The counter unit 63 is also a standard item embodying a normally closed switch. The number of cut strips desired is set up in the window 64 by the knob 65. As power relay pulses are received through the leads 66, the set number is reduced by one until, as the counter reaches zero, the normally closed switch is opened and the geared motor 60 stops instantly.

Since the control circuitry is more or less standard, it has not been shown in detail. The photo-cell 50 controls the power relay (not shown) which, in turn, power pulses the air valve 38 through the leads 67 and the counter-switch unit 63 through the leads 66.

With the device in operation, the strips cut off by the knife 32 fall through an aperture in the top of table 10 into the removable container 70.

While my invention has been developed principally in connection with the shoe manufacturing art, it is obvious that it may be employed in any art where strips of any cuttable material may be desired, particularly where a predetermined number of strips of predetermined length is required.

Having thus described my invention in detail with several modifications suggested, I claim:

1. A machine for automatically cutting strips of predetermined lengths comprising, in combination:

a supporting structure;

adjustable guide means on said supporting structure for guidably and movably supporting a continuous strip of cuttable material;

feeding means operatively connected to said strip, said feeding means comprising two electric motor driven geared rollers through which the strip passes and is advanced along said guide means;

a strip cutting mechanism positioned on said supporting structure adjacent to the path of travel of said strip;

controllable actuating means for said cutting mechanism;

means for controlling the actuation of said strip cutting mechanism comprising a pair of rotatable flanged pulleys supported in vertical alignment from the said supporting structure, the upper driving pulley being fixed with relation to said supporting structure and having a sprocket wheel attached thereto, the lower driven pulley being vertically adjustable in its support with relation to said upper driving pulley, a multiple slotted belt passing around said pulleys, a photo-electric unit supported by said supporting structure adjacent to said slotted belt and operatively connected therewith, said slotted belt passing through the continuously operated light beam emitted by said photo-electric unit, and power relay means operatively connected with said photo-electric unit for supplying electricable power impulses to the said controlling actuating means for the said cutting mechanism; and synchronizing means operatively connecting said feeding means and said controlling means comprising a sprocket wheel affixed to the axle of one of said motor driven geared rollers and a roller chain connecting said roller sprocket wheel with said upper driving pulley sprocket wheel whereby the length of the cut strips is a function of the distance between the slots in the slotted belt.

2. A strip cutting machine as claimed in claim 1 further characterized by having a counter controlled switch in the electrical circuit to the said electric motor drive for limiting the quantity of strips cut to a predetermined number.

References Cited

UNITED STATES PATENTS

| | | | |
|---|---|---|---|
| 412,503 | 10/1889 | Hoople | 83—449 |
| 3,263,884 | 8/1966 | Doerfling | 83—71 X |

ANDREW R. JUHASZ, *Primary Examiner.*

U.S. Cl. X.R.

83—449